(12) United States Patent
Chung et al.

(10) Patent No.: US 8,818,470 B2
(45) Date of Patent: Aug. 26, 2014

(54) MOBILE COMMUNICATION DEVICE

(75) Inventors: Kuan-Jen Chung, New Taipei (TW);
Wen-Yi Tsai, New Taipei (TW);
Chia-Wei Su, New Taipei (TW);
Pei-Cheng Hu, New Taipei (TW)

(73) Assignee: Wistron Corporation, New Taipei (TW)

( * ) Notice: Subject to any disclaimer, the term of this patent is extended or adjusted under 35 U.S.C. 154(b) by 50 days.

(21) Appl. No.: 13/597,278

(22) Filed: Aug. 29, 2012

(65) Prior Publication Data
US 2013/0335258 A1    Dec. 19, 2013

(30) Foreign Application Priority Data

Jun. 19, 2012    (TW) .............................. 101121910 A

(51) Int. Cl.
*H04M 1/00*    (2006.01)
(52) U.S. Cl.
USPC ...................................... 455/575.5; 455/90.3
(58) Field of Classification Search
CPC ..................... H04M 1/72519; H04M 1/72522; H01Q 1/245; H01Q 1/243; H04B 1/3838; H04B 1/3833
USPC ........... 455/550.1, 575.1, 90.3, 575.5, 78, 79, 455/82, 83
See application file for complete search history.

(56) References Cited

U.S. PATENT DOCUMENTS

2011/0195661 A1*  8/2011  Miyashita ....................... 455/39

FOREIGN PATENT DOCUMENTS

TW            M408882           8/2011

* cited by examiner

*Primary Examiner* — Nhan Le
(74) *Attorney, Agent, or Firm* — Jianq Chyun IP Office

(57) ABSTRACT

A mobile communication device including a system ground plane, an antenna, a signal distributor, a transceiver and a sensing controller is provided. The antenna converts an electromagnetic wave to a radio-frequency signal. Besides, the antenna and the system ground plane form a sensing capacitor to detect an object and generate a detecting signal accordingly. The signal distributor is electrically connected to the antenna through a first connection terminal and a second connection terminal and guides the radio-frequency signal and the detecting signal from the antenna to a third connection terminal and a fourth connection terminal. The transceiver is electrically connected to the third connection terminal and processes the radio-frequency signal. The sensing controller is electrically connected to the fourth connection terminal and determines whether the object exists around the antenna according to the sensing signal.

10 Claims, 3 Drawing Sheets

MOBILE COMMUNICATION DEVICE

CROSS-REFERENCE TO RELATED APPLICATION

This application claims the priority benefit of Taiwan application serial no. 101121910, filed on Jun. 19, 2012. The entirety of the above-mentioned patent application is hereby incorporated by reference herein and made a part of this specification.

BACKGROUND

1. Field of the Invention

The present invention is directed to a mobile communication device and more particularly, to a mobile communication device using an antenna and a system ground plane to form a sensing capacitor.

2. Description of Related Art

During the development of the wireless communication, the Federal Communications Commission (hereinafter as FCC) has set up a specific absorption ratio (hereinafter as SAR) standard to restrict energy or the highest limitation that a mobile communication device is allowed to radiate so as to prevent an electromagnetic wave radiated from an antenna to harm human health.

In order to comply with the SAR value regulated by the FCC, in most of the currently existing mobile communication devices, a proximity sensor is commonly disposed around the antenna. The proximity sensor includes a sensing capacitor and a sensing controller. Thus, when a human body approaches the antenna, an electric charge of the sensing capacitor is changed in response to the approach of the human body. Moreover, the sensing controller instructs a system to lower down the antenna radiated power so as to prevent the overly high power absorbed by the human body.

However, in order to improve sensitivity of the sensing capacitor, a metal sheet used to form the sensing capacitor is usually designed in a large size. Besides, in actual configuration, the metal sheet of the sensing capacitor cannot be too close to the system ground plane so as to avoid a sensing capacitor failure. Further, the metal sheet of the sensing capacitor cannot be too close to the antenna, either so as to avoid influence on the antenna reception quality. Therefore, the metal sheet in the sensing capacitor often consumes enormous hardware space for being disposed in the mobile communication device, such that the miniaturization development of the mobile communication device is limited, and costs spent on material purchasing and working hours of assembly are increased due to additional disposition of the metal sheet when manufacturing.

SUMMARY

The present invention is directed to a mobile communication device using an antenna and a system ground plane to form a sensing capacitor so as to improve the miniaturization development of the mobile communication device.

The present invention is directed to a mobile communication device including a system ground plane, an antenna, a signal distributor, a transceiver and a sensing controller. The antenna is configured to convert an electromagnetic wave to a radio-frequency signal. In addition, the antenna and the system ground plane are used to form a sensing capacitor to detect an object so as to generate a detecting signal. The signal distributor has a first, a second, a third and a fourth connection terminals and is electrically connected to the antenna through the first connection terminal and the second connection terminal. Besides, the signal distributor guides the radio-frequency signal from the antenna to the third connection terminal and guides the detecting signal from the antenna to the fourth connection terminal. The transceiver is electrically with the third connection terminal and configured to process the radio-frequency signal. The sensing controller is electrically connected to the fourth connection terminal and determines whether the object exists around the antenna according to the sensing signal.

In an embodiment of the present invention, the signal distributor includes a first impedance component and a second impedance component. The first impedance component is electrically connected between the first connection terminal and the third connection terminal and configured to transmit the radio-frequency signal and block the detecting signal. The second impedance component is electrically connected between the second connection terminal and the fourth connection terminal and configured to transmit the detecting signal and block the radio-frequency signal.

In an embodiment of the present invention, the antenna includes a radiating part and a feeding part. The radiating part is configured to convert the electromagnetic wave to the radio-frequency signal and used with the system ground plane to form the sensing capacitor. The feeding part is electrically connected to the radiating part, wherein the first connection terminal of the signal distributor is electrically connected to the feeding part, and the second connection terminal of the signal distributor is electrically connected to either the radiating part or the feeding part.

In an embodiment of the present invention, the sensing controller further determines whether to generate a control signal according to a determination result to control a radiated power of the antenna according to the control signal.

In an embodiment of the present invention, when the determination result is that the object exists around the antenna, the sensing controller generates the control signal, and the transceiver lowers down the radiated power of the antenna.

To sum up, in the present invention, the antenna is used to receive and transmit an electromagnetic wave and used with the system ground plane to form a sensing capacitor to detect an object. Accordingly, comparing with the current technique, in the mobile communication device of the present invention, the sensing capacitor can be formed without additionally disposing a metal sheet so as to facilitate the miniaturization development of the mobile communication device.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
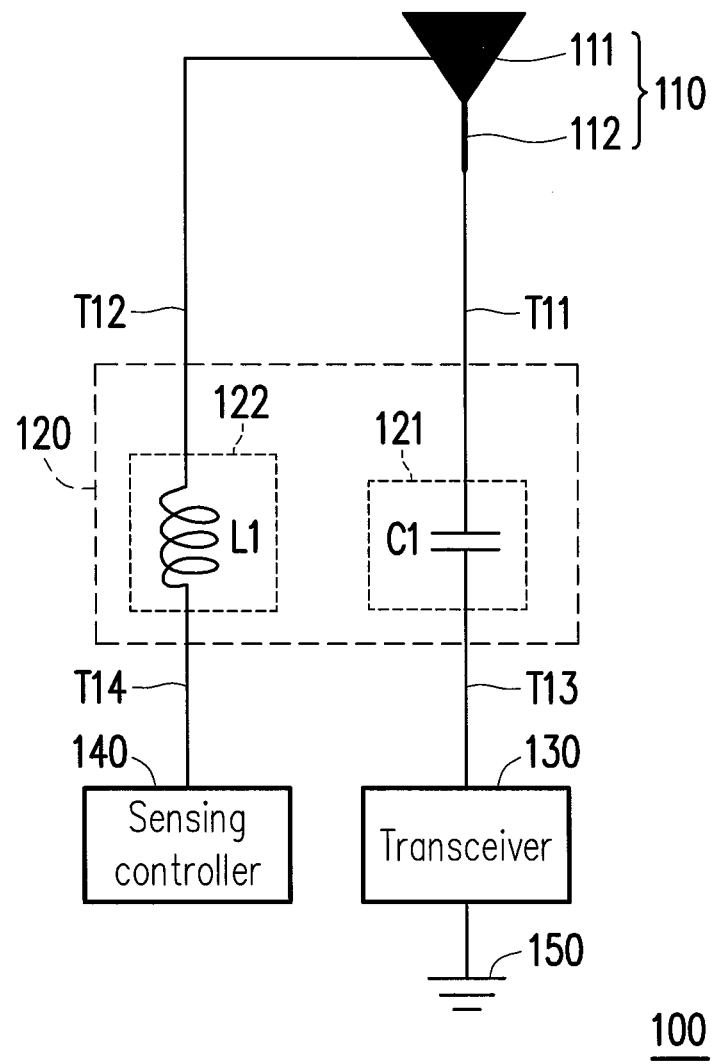
FIG. 1 is a schematic diagram illustrating a mobile communication device according to an embodiment of the present invention.

FIG. 1 is a schematic diagram illustrating a mobile communication device according to an embodiment of the present invention. Referring to FIG. 1, a mobile communication device 100 includes an antenna 110, a signal distributor 120, a transceiver 130, a sensing controller 140 and a system ground plane 150. The antenna 110 may be, for example, a general type antenna without a grounding part, such as a monopole antenna, a slot antenna, a loop antenna and so on. Thus, in the embodiment of FIG. 1, the antenna 110 includes a radiating part 111 and a feeding part 112.

Continuing to refer to FIG. 1, the radiating part 111 of the antenna 110 converts an electromagnetic wave to a radio-frequency signal for being used by an internal circuit of the mobile communication device 100. Additionally, the radiating part 111 of the antenna 110 and the system ground plane 150 are used to form a sensing capacitor. Thus, the sensing capacitor formed by the radiating part 111 and the system ground plane 150 is configured to detect an object so as to generate a detecting signal. Besides, the feeding part 112 of the antenna 110 is electrically connected to the radiating part 111.

In other words, in addition to converting the electromagnetic wave, the antenna 110 is further used with the system ground plane 150 to form a sensing capacitor. Therein, the radiating part 111 of the antenna 110 is equivalent to a metal electrode of the sensing capacitor, and the system ground plane 150 is equivalent to another metal electrode of the sensing capacitor. In addition, the sensing capacitor formed by the radiating part 111 of the antenna 110 and the system ground plane 150 is configured to detect an object, and the mobile communication device 100 outputs a corresponding detecting signal through the antenna 110. For example, when an object approaches the antenna 110, a electric charge of the sensing capacitor, i.e. a electric charge between the radiating part 111 and the system ground plane 150, is changed correspondingly, which is further reflected on the detecting signal.

Moreover, the signal distributor 120 has a first connection terminal T11, a second connection terminal T12, a third connection terminal T13 and a fourth connection terminal T14. The signal distributor 120 is electrically connected to the antenna 110 through the first connection terminal T11 and the second connection terminal T12. In addition, the signal distributor 120 guides the radio-frequency signal and the detecting signal from the antenna 110 to the third connection terminal T13 and the fourth connection terminal T14, respectively.

For example, the signal distributor 120 includes a first impedance component 121 and a second impedance component 122 which are not connected in serial type. Therein, the first impedance component 121 is electrically connected between the first connection terminal T11 and the third connection terminal T13. In addition, the first impedance component 121 is configured to transmit the radio-frequency signal and block the detecting signal. Thus, the radio-frequency signal from the antenna 110 may be guided to the third connection terminal T13. On the other hand, the second impedance component 122 is electrically between the second connection terminal T12 and the fourth connection terminal T14. In addition, the second impedance component 122 is configured to transmit the detecting signal and block the radio-frequency signal. Thus, the detecting signal from the antenna 110 may be guided to the fourth connection terminal T14.

Moreover, in actual configuration, the person with ordinary skills in this art may dispose the first impedance component 121 and the second impedance component 122 on a single circuit board or separate circuit board based on design requirements. For example, in an embodiment, the first impedance component 121 may be disposed together with the transceiver 130 and the sensing controller 140 on a first circuit board (not shown), and the second impedance component 122 may be disposed together with the antenna 110 on a second circuit board (not shown). Alternatively, the second impedance component 122 may be further disposed on the antenna 110 directly, i.e. the second impedance component 122 may be electrically connected to the antenna 110 directly without through any conductive line so as to avoid the antenna 110 from being influenced by any other conductive line. Additionally, in another embodiment, the antenna 110 may be independently disposed on the first circuit board, while the first impedance component 121, the second impedance component 122, the transceiver 130 and the sensing controller 140 may be together disposed on the second circuit board.

It should be mentioned that the radio-frequency signal from the antenna 110 is a high-frequency signal, and the detecting signal from the antenna 110 is a low-frequency signal. And, it is known that an impedance of a capacitor is inversely proportional to signal frequency. Namely, a capacitor operated in a low frequency approximates an open circuit, and a capacitor operated in a high frequency approximates a short circuit. Thus, as shown in FIG. 1, in an exemplary embodiment, the first impedance component 121 may be composed of a capacitor C1 to transmit a high-frequency signal (e.g. the radio-frequency signal) and block a low-frequency signal (e.g. the detecting signal). On the contrary, an impedance of an inductor is proportional to signal frequency. Namely, an inductor operated in a low frequency approximates a short circuit, and an inductor operated in a high frequency approximates an open circuit. Thus, as shown in FIG. 1, in an exemplary embodiment, the second impedance component 122 may be composed of an inductor L1 so as to transmit a low-frequency signal (e.g. the detecting signal) and block a high-frequency signal (e.g. the radio-frequency signal).

Besides, although a connection type of the antenna 110 and the signal distributor 120 is exemplarily described in the embodiment illustrated in FIG. 1, but it is not construed as limitation to the present invention. For example, in the embodiment illustrated in FIG. 1, the first connection terminal T11 of the signal distributor 120 is electrically connected to the feeding part 112 of the antenna 110, and the second connection terminal T12 of the signal distributor 120 is electrically connected to the radiating part 111 of the antenna 110. However, in another embodiment, both the first connection terminal T11 and the second connection terminal T12 may also be electrically connected to the feeding part 112 of the antenna 110.

Furthermore, the transceiver 130 is electrically connected to the third connection terminal T13 of the signal distributor 120 to receive the radio-frequency signal. Besides, the transceiver 130 is further configured to process the radio-frequency signal. Moreover, the sensing controller 140 is electrically connected to the fourth connection terminal T14 of the signal distributor 120 to receive the detecting signal. Besides, the sensing controller 140 further determines whether an object exists around the antenna 110 according to the detecting signal.

For example, when an object approaches the antenna 110, an electric charge between the radiating part 111 and the system ground plane 150 is changed correspondingly, which is further reflected on the detecting signal. Thus, the sensing controller 140 may determine whether an object exists around the antenna 110 according to the detecting signal. Moreover, the sensing controller 140 further determines whether to generate a control signal according a result of the aforementioned determination so as to control the radiated power of the antenna 110. For example, when the determination result is that an object exists around the antenna 110, it represents that a human body is located around the antenna 110. Therefore, the sensing controller 140 at this moment generates the control signal, and the transceiver 130 lowers down the radiated power of the antenna 110 according to the control signal. Accordingly, the influence that the electromagnetic wave brings to the human body may be reduced, so that the SAR value of the mobile communication device 100 complies with testing standards.

Figure 2:
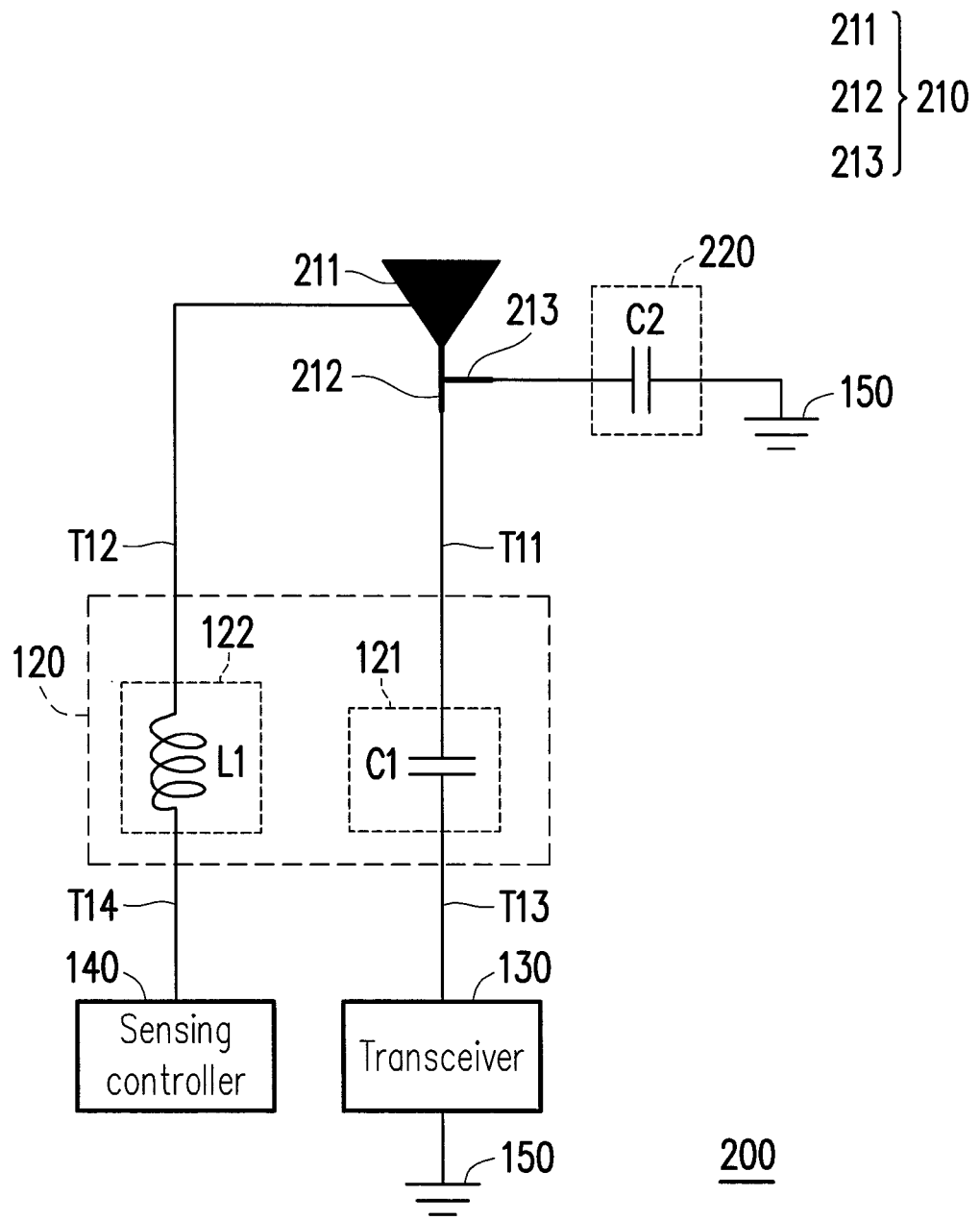
FIG. 2 is a schematic diagram illustrating a mobile communication device according to another embodiment of the present invention.

It should be noted that in the embodiment illustrated in FIG. 1, a general type antenna without a grounding part is taken as an example of implementation type for illustrating the antenna 110, but is not construed as limitation to the present invention. For example, FIG. 2 is a schematic diagram illustrating a mobile communication device according to another embodiment of the present invention. For describing the present invention in a consistent context, in each embodiment, the same or similar elements are referred to by using the same symbols and terms.

Referring to FIG. 1 with FIG. 2, the main difference between the both is that an antenna 210 depicted in FIG. 2 is an antenna with a grounding part, and an mobile communication device 200 illustrated in FIG. 2 further includes a third impedance component 220. Specifically speaking, the antenna 210 includes a radiating part 211, a feeding part 212 and a grounding part 213. The grounding part 213 is electrically connected to the radiating part 211 and is electrically connected to the system ground plane 150 through the third impedance component 220. The third impedance component 220 is, for example, consisted of a capacitor C2. Thus, an exciting current excited by the antenna 210 is conducted to the system ground plane 150 through the third impedance component 220.

Moreover, in the embodiment illustrated in FIG. 2, the first connection terminal T11 of the signal distributor 120 is electrically connected to the feeding part 112 of the antenna 110, and the second connection terminal T12 of the signal distributor 120 is electrically connected to the radiating part 111 of the antenna 210, but the present invention is not limited thereto. For example, in another embodiment, the first connection terminal T11 of the signal distributor 120 may be electrically connected to the feeding part 212 of the antenna 210, and the second connection terminal T12 of the signal distributor 120 may be electrically connected to the feeding part 212 or the grounding part 213 of the antenna 210.

On the other hand, similar to the embodiment illustrated in FIG. 1, the radiating part 211 converts the electromagnetic wave to the radio-frequency signal. In addition, the radiating part 211 and the system ground plane 150 are used to form a sensing capacitor so as to generate a corresponding detecting signal. Moreover, the feeding part 212 is electrically connected to the radiating part 211. As for in the embodiment illustrated in FIG. 2, detailed operations of the signal distributor 120, the transceiver 130 and the sensing controller 140 have been described in the embodiment of FIG. 1, which are not repeated herein.

Figure 3:
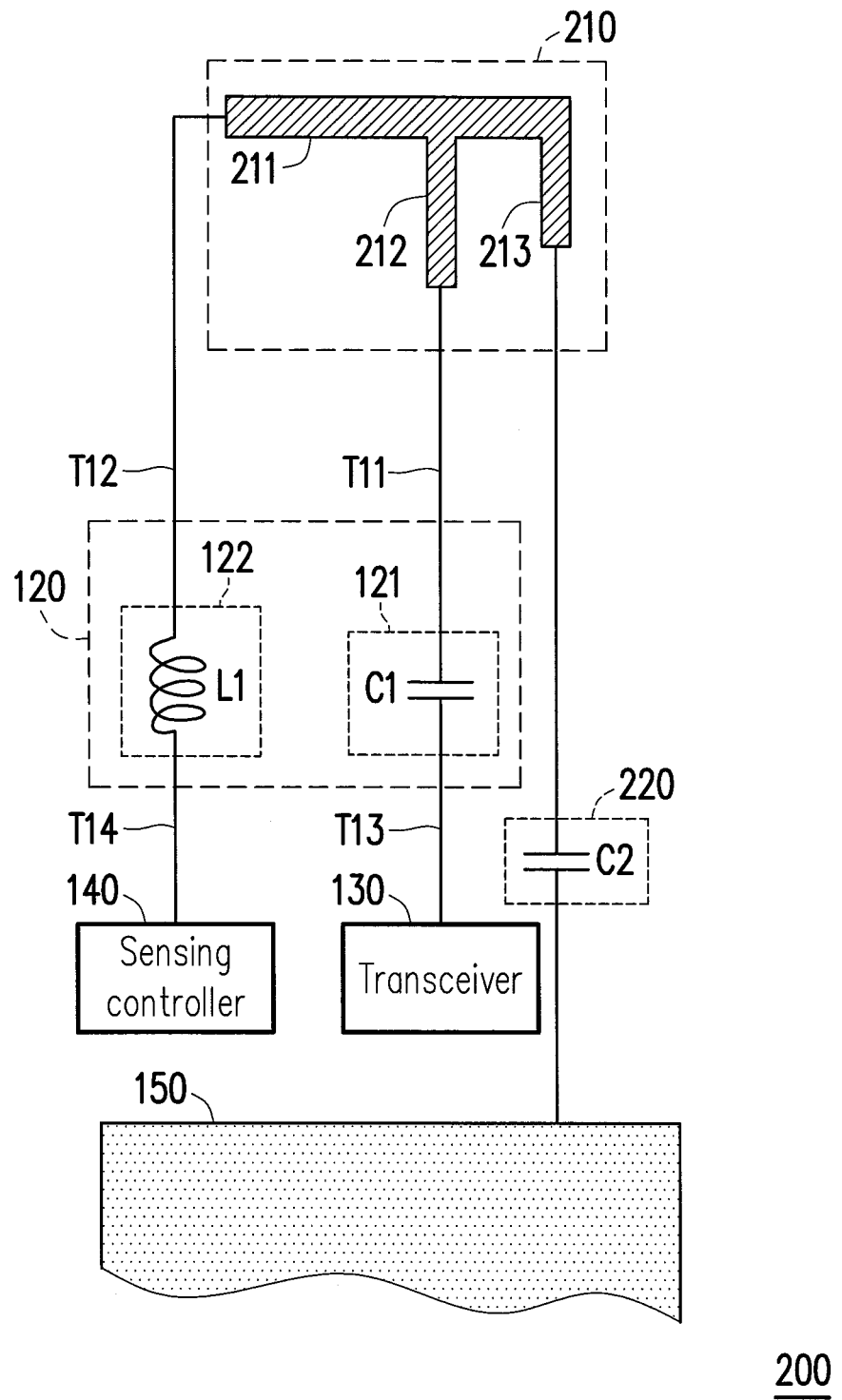
FIG. 3 is another schematic diagram illustrating the mobile communication device depicted in FIG. 2.

It should be mentioned that the antenna 210 described in the embodiment of FIG. 2 may be, for example, an inverted-F antenna. For instance, when the antenna 210 is an inverted-F antenna, the mobile communication device 200 illustrated in the embodiment of FIG. 2 may be further represented as in FIG. 3. Here, as shown in FIG. 3, the antenna 210 composed of the radiating part 211, the feeding part 212 and the grounding part 213 is in a shape like an inverted alphabet F. In addition, in an actual configuration, the system ground plane 150 as illustrated in FIG. 1 to FIG. 2 may be, for example, any one of a conductive plane, a conductive layer or a conductive component disposed in the mobile communication device 200, and thus, in FIG. 3, the system ground plane 150 is further represented as a conductive plane.

Based on the above, in the present invention, the antenna is configured to receive an electromagnetic wave, and the antenna and the system ground plane are used to form a sensing capacitor. Accordingly, comparing with the current technique, the sensing capacitor can be formed without disposing a metal sheet in the mobile communication device of the present invention facilitate the miniaturization development of the mobile communication device and reduction of manufacturing cost.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A mobile communication device, comprising:
  a system ground plane;
  an antenna, configured to convert an electromagnetic wave to a radio-frequency signal and forming a sensing capacitor together with the system ground plane to detect an object so as to generate a detecting signal;
  a signal distributor, having a first, a second, a third and a fourth connection terminals, electrically connected to the antenna through the first connection terminal and the second connection terminal, guiding the radio-frequency signal from the antenna to the third connection terminal and guiding the detecting signal from the antenna to the fourth connection terminal;
  a transceiver, electrically connected to the third connection terminal and configured to process the radio-frequency signal; and
  a sensing controller, electrically connected to the fourth connection terminal and determining whether the object exists around the antenna according to the sensing signal.

2. The mobile communication device as recited in claim 1, wherein the signal distributor comprises:
  a first impedance component, electrically connected between the first connection terminal and the third connection terminal and configured to transmit the radio-frequency signal and block the detecting signal; and
  a second impedance component, electrically connected between the second connection terminal and the fourth connection terminal and configured to transmit the detecting signal and block the radio-frequency signal.

3. The mobile communication device as recited in claim 2, wherein the first impedance component is a capacitor, and the second impedance component is an inductor.

4. The mobile communication device as recited in claim 1, wherein the antenna comprises:
  a radiating part, configured to convert the electromagnetic wave to the radio-frequency signal and forming the sensing capacitor together with the system ground plane; and
  a feeding part, electrically connected to the radiating part, wherein the first connection terminal of the signal distributor is electrically connected to the feeding part, and the second connection terminal of the signal distributor is electrically connected to either the radiating part or the feeding part.

5. The mobile communication device as recited in claim 4, wherein the antenna is a monopole antenna, a slot antenna or a loop antenna.

6. The mobile communication device as recited in claim 4, wherein the antenna further comprises:
   a grounding part, electrically connected to the radiating part and electrically connected to the system ground plane through a third impedance component.

7. The mobile communication device as recited in claim 6, wherein the third impedance component is a capacitor.

8. The mobile communication device as recited in claim 6, wherein the antenna is an inverted-F antenna.

9. The mobile communication device as recited in claim 1, wherein the sensing controller is further configured to determine whether to generate a control signal according to a determination result to control a radiated power of the antenna.

10. The mobile communication device as recited in claim 9, wherein when the determination result is that the object exists around the antenna, the sensing controller generates the control signal, and the transceiver lowers down the radiated power of the antenna according to the control signal.

* * * * *